US011118682B2

(12) United States Patent
Jordan et al.

(10) Patent No.: US 11,118,682 B2
(45) Date of Patent: Sep. 14, 2021

(54) SEAL ARRANGEMENT

(71) Applicant: Trelleborg Sealing Solutions Germany GmbH, Stuttgart (DE)

(72) Inventors: Holger Jordan, Neuhausen (DE); Mandy Wilke, Böblingen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 314 days.

(21) Appl. No.: 16/521,589

(22) Filed: Jul. 25, 2019

(65) Prior Publication Data
US 2019/0383394 A1 Dec. 19, 2019

Related U.S. Application Data

(63) Continuation of application No. PCT/EP2018/053032, filed on Feb. 7, 2018.

(30) Foreign Application Priority Data

Feb. 17, 2017 (DE) .................... 10 2017 202 613.8

(51) Int. Cl.
*F16J 15/16* (2006.01)
*F16J 15/3204* (2016.01)
*F16J 15/3252* (2016.01)

(52) U.S. Cl.
CPC ......... *F16J 15/164* (2013.01); *F16J 15/3204* (2013.01); *F16J 15/3252* (2013.01)

(58) Field of Classification Search
CPC ..... F16J 15/164; F16J 15/3204; F16J 15/3252
See application file for complete search history.

(56) References Cited

U.S. PATENT DOCUMENTS

| 4,553,762 A | * | 11/1985 | Hoelzer | F16J 15/164 |
| | | | | 277/400 |
| 4,844,484 A | * | 7/1989 | Antonini | F16J 15/3224 |
| | | | | 277/561 |
| 2015/0001810 A1 | * | 1/2015 | Broadbent | F16J 15/3256 |
| | | | | 277/402 |

FOREIGN PATENT DOCUMENTS

| DE | 10 2014 226 102 A1 | 6/2016 |
| EP | 0 123 724 A2 | 11/1984 |
| GN | 105 221 580 A | 1/2016 |

* cited by examiner

*Primary Examiner* — Vishal A Patel
(74) *Attorney, Agent, or Firm* — Hackler Daghighian Martino & Novak

(57) ABSTRACT

A seal arrangement includes first and second machine parts rotationally movable and forming a sealing gap. A radial shaft seal ring seals a high pressure side against a low pressure side. A base section held on a sealing holding structure of the first machine part has a sealing head contacting the sealing surface of the second machine part. The sealing surface has a high and low pressure first sealing surface sections. The first sealing surface section extends away from the sealing holding structure forming an acute angle. The sealing head contacts the first sealing section when an operating pressure is applied to the high pressure side, said operating pressure being smaller than a specified limit operating pressure value. The second sealing surface section forms an axial stop for the sealing head when an operating pressure is applied to the high pressure side being at least the limit operating pressure value.

21 Claims, 6 Drawing Sheets

SEAL ARRANGEMENT

CROSS-REFERENCE TO RELATED APPLICATIONS

This continuation application claims priority to PCT/EP2018/053032 filed on Feb. 7, 2018 which has published as WO 2018/149711 A1 and also the German application number 10 2017 202 613.8 filed on Feb. 17, 2017, the entire contents of which are fully incorporated herein with these references.

DESCRIPTION

Field of the Invention

The invention relates to a seal arrangement comprising a first machine part and a second machine part, which are arranged spaced apart from one another, forming a sealing gap and movable relative to one another in a rotational manner about a movement axis. The seal arrangement has a radial shaft sealing ring for sealing a high pressure side of the sealing gap, to which high pressure may be applied by means of a fluid, against a low pressure side of the sealing gap. The radial shaft sealing ring comprises a base section, which is held on a seal holding structure of the first machine part and a base section flexibly hinged to the sealing head, which contacts the sealing surface of the second machine part in a radial direction in a dynamically sealing manner.

Background of the Invention

Such dynamic sealing arrangements constitute essential construction elements in mechanical engineering as well as in vehicle construction. At the same time, such radial shaft seal rings are in practice exposed to continually increasing operating pressures, temperatures and sliding speeds, not least due to the technical advancement of the units. The failure of radial shaft sealing rings results in an undesirable leakage of the fluid to be sealed, which may have devastating consequences, in particular, in critical applications. The radial shaft sealing rings must therefore meet increasingly higher demands with respect to their sealing capacity and, at the same time, should also have an improved service life.

A shortening of the service life of the radial shaft seal rings caused by friction is counteracted in practice primarily by optimized lubrication in the area of the sealing section of the radial shaft sealing ring contacting the sealing surface, by the use of material pairings with preferably minimal sliding friction, as well as an optimized heat dissipation in the area of the sealing zone. In this regard, the attempt is also being made to improve the so-called return drag capability of the radial shaft sealing rings.

The object of the invention is to provide a seal arrangement in which the radial shaft sealing ring is better protected against excessive mechanical and thermal stresses, particularly at high or very high sliding speeds and even when pressure is applied to the high pressure side of the sealing gap.

SUMMARY OF THE INVENTION

The seal arrangement according to the invention is specified in claim 1. Further embodiments of the invention are the subject matter of the dependent claims.

The seal arrangement according to the invention is characterized essentially in that the sealing surface has a first sealing surface section adjacent to the high-pressure side and a second sealing surface section adjoining it in the axial direction and adjacent to the low-pressure side. The first sealing surface section extends diagonally in the axial direction toward the low pressure side relative to the movement axis at an acute angle. The first sealing surface section extends with a slight inclination in a radial direction away from the movement axis toward the low pressure side. The sealing head contacts the first sealing surface section of the sealing surface when an operating pressure $p_w$ is applied to the high-pressure side H of the sealing gap, said operating pressure being less than a predetermined limit operating pressure $p_{limit}$. According to the invention, the second sealing surface section extends radially diagonally in the direction of the movement axis in the direction of the low pressure side and forms an axial stop for the sealing head, which the sealing head contacts in a sealing manner in the axial direction when an operating pressure $p_w$ is applied to the high pressure side, said operating pressure being equal to or greater than the limit operating pressure value $p_{limit}$.

In the case of a rotary relative movement of the two machine parts, either the radial shaft sealing ring rotates together with the machine part having the seal holding structure relative to the sealing surface, or the machine part having the sealing surface rotates relative to the radial shaft sealing ring. The fluid situated on the high pressure side is moved in the process as a result of its friction on the sealing surface or on the first machine part with the radial shaft sealing ring held thereon, and as a result of its inherent viscosity in a flow directed around the movement axis (so-called Taylor Couette flow).

If the machine part having the sealing surface—in relation to the movement axis of the two machine parts—is the machine part situated inwardly in the radial direction and set in rotation, then the fluid accelerated on the machine part having the sealing surface pushes outward at higher rotational speeds due to the centrifugal force. In the process, the fluid contacting the sealing surface may flow axially in the direction of the high pressure side due to adhesion forces present between the fluid and the sealing surface on the first sealing surface section of the sealing surface on the high pressure side. In a corresponding manner, in the case of a first machine part situated outwardly in a radial direction and rotating, the fluid will flow axially in the direction of the high-pressure side due to its viscosity and to the interaction with adhesive forces occurring on the sealing surface along the first (and only slightly inclined to the movement axis) sealing surface section.

If the machine part having the sealing surface is the machine part situated outwardly in the radial direction, then the fluid is moved radially outwardly due to the centrifugal force and flows in the radial direction toward the first sealing surface section. In the process, the fluid will accumulate and possibly swirl on the high pressure side in the direction of the low pressure side in the area of the sealing head contacting the sealing surface. The fluid may escape only in the direction of the high-pressure side and thus flow in the axial direction on the first sealing surface section of the sealing surface.

An axially directed fluid flow may thus be generated, especially at high rotational speeds, due to the geometric shape of the sealing surface on the high pressure side of the sealing gap. As a result of this fluid flow, fluid flowing on the high pressure side flows toward the sealing head on the high pressure side in the area of its sealing section contacting the sealing surface or contact surface area, thus, in the area of the sealing zone. As a result, the sealing zone is mechanically flushed during operation of the seal arrangement, possibly freed of contaminants, and the lubrication and dissipation of heat from the sealing zone is further improved. Turbulences occurring in the fluid due to the centrifugal force acting on the fluid cause the thorough mixing of the fluid on the high-pressure side which is favorable for heat dissipation. In addition, contaminants adhering to the sealing surface or the sealing head may be removed from the sealing zone and flushed away. The service life of the radial shaft seal ring may be further improved on the whole as a result of simple design measures.

The above-described induction of an axially directed fluid flow may be further supported according to one refinement of the invention in that the first sealing surface section of the sealing surface includes one or multiple spin structures or tribo structures on its edge section on the high-pressure side, i.e., the edge section facing the high pressure side. The tribo structure(s) is/are designed in such a way that they cause or support a fluid flow during a relative movement of the two machine parts, which is directed away from the low-pressure side in the axial direction, i.e., directed toward the high-pressure side. The tribo structure or tribo structures in this case may comprise a recess, in particular a groove or the like, and/or an elevation or a profile extension, which extends in the radial direction away from the edge section of the first sealing surface section. The sealing head of the radial sealing element preferably does not contact this edge portion of the first sealing surface section when in the state of the seal assembly not acted upon by pressure, i.e., in its rest position. This may counteract undesired wear or damage to the sealing head.

In dynamic sealing systems, of course, leakage of the fluid—even if only slight—from the high-pressure side to be sealed to the low-pressure side cannot be completely prevented. The relative movement of the two machine parts causes the fluid (leakage fluid) that has reached the low-pressure side of the sealing head to be moved along the sealing surface in the axial direction because of the centrifugal force and its adhesive behavior on the sealing surface.

If the second machine part having the sealing surface is the machine part of the sealing arrangement situated externally in the radial direction, the fluid is retained on the second sealing surface section as a result of the geometric shape of the second sealing surface section. This second sealing surface section is therefore preferably designed, at least in sections, at a larger angle to the movement axis, i.e., steeper, relative to the first sealing surface section. The fluid flows largely or completely in the axial direction to the sealing zone. This also favors lubrication of the sealing zone on the low-pressure side and an improved return drag behavior of the fluid to the high-pressure side of the radial shaft seal ring.

It should be noted that when a pressure is applied to the high pressure side at an operating pressure $p_w$ with $p_w$ being less than or equal to the limit operating pressure value $p_{limit}$ relative to the base section, the sealing head may deflect, i.e., pivot or yield relative to the base section in the direction of the low-pressure side. Applying pressure to the high-pressure side thus causes a translational displacement of the sealing zone—proportionally to the pressure on the respective operating pressure $p_w$ prevailing on the high-pressure side—between the sealing head and the sealing surface, i.e., its contact surface area, in the axial direction relative to the sealing surface. The first sealing surface section, by extending diagonally away with a minimal inclination from the movement axis in the direction of the low-pressure side, thus, moving further away in the axial profile from the seal holding structure of the first machine part, may relieve the sealing head with respect to its contact surface pressure on the first sealing surface section of the sealing surface. The contact surface pressure may be adjusted as a function of an operating pressure prevailing on the high-pressure side. This may effectively counteract an undesirable increase in the friction between the sealing head and the sealing surface, as well as an accompanying thermal load on the sealing head. Thus, mechanothermal stress of the radial shaft sealing ring or of the sealing head may on the whole be reduced during operation of the seal arrangement. This is true at least in the case where the sealing head contacts the sealing surface pre-stressed in a sealing manner due to the inherent elasticity of the material of the radial shaft sealing ring in the radial direction.

If the operating pressure on the high-pressure side reaches or exceeds the specified limit pressure value $p_{limit}$, then the sealing head of the radial shaft sealing ring is pressed against the axial stop formed by the second sealing surface section in an axial direction relative to the movement axis. This ensures a reliable sealing capacity of the radial shaft seal, even at high operating pressures. A so-called blowby may be reliably avoided by a corresponding geometric shape and dimensioning of the second sealing surface section in the radial direction. In this way, the second sealing surface section extends radially preferably to such an extent on the low pressure side in the direction of the first machine part that the sealing head of the radial shaft sealing ring is completely covered by the second sealing surface section in the axial direction. According to the invention, the second sealing surface section may extend in an extreme case into a groove, for example, into a holding groove serving as a seal holding structure, of the first machine part, in order in this way to provide the greatest possible axial support or support surface for the sealing head. This may prevent a blow-out of the sealing head. Because the sealing head of the radial shaft sealing ring is articulated flexibly on the base section, vibrations of the two machine parts, on the one hand, as well as an eccentricity of the second machine part having the sealing surface virtually unavoidable in practice, may be reliably absorbed or compensated for by the radial shaft sealing ring. A local mechanical and therefore accompanying thermal overloading of the sealing head in the area in which its sealing section contacts the sealing surface may thus again be better counteracted.

The connecting section in this case may in particular have a membrane-like design, in order to ensure a particularly rapid and sensitive response of the radial shaft seal ring to changes in the operating pressure $p_w$ on the high-pressure side.

According to the invention, the radial shaft seal ring may in particular be wholly or partially made of an elastically deformable elastomer. The material of the radial shaft seal may include fillers or reinforcing inserts according to need, in order to reinforce at least partially the radial shaft seal ring.

The seal arrangement may optionally include a second axial stop for the radial shaft sealing ring, in order to prevent excessive contact pressure of the sealing head on the axial stop on the low-pressure-side formed by the second sealing surface section. The second axial stop may in particular be formed by the first machine part or may be attached to the first machine part. For example, an annular angle profile is conceivable which extends radially in the direction of the second machine part.

According to the invention, the radial shaft sealing ring may be situated in a cartridge, which is held on the first machine part. As a result, the assembly of the radial shaft seal may be further simplified in individual cases. The cartridge may, if necessary, be made of metal, of a plastic or of a composite material and may have approximately an L-shaped or U-shaped cross-section. The cartridge may also be designed in several parts.

According to the invention, the first sealing surface section may have a linear or a concave contour in the axial direction. In the former case, the first sealing surface section thus has a cone-shaped design. As a result, a finely graded relief/load of the sealing head along the first sealing surface section may be achieved in a structurally simple manner.

According to the invention, the second sealing surface section may at least partially have a concave contour in the axial direction. In this case, the second sealing surface section particularly preferably has a curvature profile or radius which is designed to correspond to or complement a curvature profile or radius of the sealing head. As a result, the sealing head may be placed in contact and be supported on a large area of the axial stop. This may counteract local excessive stress, in particular, shear damage to the sealing head. In addition, this may counteract an undesirable jamming of the sealing head on the sealing surface when the operating pressure on the high pressure side drops, so that the sealing head is able to pivot back in the direction of its non-pressurized starting position relative to the sealing surface. The radius of the second sealing surface section is preferably selected to be smaller than an optional radius of the first sealing surface section.

According to the invention, the sealing surface of the second machine part may be formed directly by the second machine part, i.e., by its surface. However, the geometric configuration of the sealing surface may require a complex manufacturing effort depending on the material of the second machine part, and thus generate high production costs. The sealing surface is therefore particularly preferably formed at least partially, preferably completely, by a sleeve element, which is situated at or fastened on the second machine part. This offers manufacturing advantages on the one hand and allows for lower production costs on the other hand. Thus, the sleeve element may in particular be made of a higher quality material than the second machine part, and in the process may be manufactured cost-efficiently and with high dimensional accuracy. In this design, the material of the second machine part may also be selected independently or largely independently of requirements as they are imposed on mating surfaces for radial shaft seals rings. The second machine part may, for example, be made of a plastic or of a plastic composite material, for example, a carbon fiber material.

According to the invention, the sleeve element may be made, in particular, of metal, preferably of a case-hardened steel or of a ceramic material. Also conceivable is a sleeve element made of a preferably graphite-containing composite material. In this way, the seal arrangement may be designed in a simple and cost-efficient manner for different operating conditions. The seal arrangement has a particularly wide range of use as a result.

According to the invention, the sleeve element may be pressed together with, welded, soldered or glued to the second machine part. It is also conceivable, for example, that the sleeve element is screwed to the second machine part or latched to the second machine part.

According to one particularly preferred refinement of the invention, the sleeve element is mounted or situated on the second machine part via an elastically deformable intermediate element or via multiple elastically deformable intermediate elements. The intermediate element is thus situated between the second machine part and the sleeve element in the radial direction. In this sandwich construction, the intermediate element may have, in particular, an annular or sleeve-shaped and, if necessary, multi-part design. By using such an intermediate element, it is possible on the one hand to further simplify the mounting of the sleeve element. Irregularities of the second machine part in the area covered by the sleeve element may be offset (compensated for) by the intermediate element, so that expensive finishing processes of the second machine part become unnecessary. This is advantageous in terms of the manufacturing costs of the seal arrangement.

It should also be noted that the sleeve element may be designed on the whole with a lower material thickness by being mounted on an elastically deformable intermediate element, without resulting in functional losses of the seal arrangement. As a result, brittle or amorphous materials, possibly even in a monocrystalline version, may be used in a simplified manner for the sealing surface. Oxides with metal are conceivable, such as, for example, silicon dioxide ($SiO_2$) or aluminum oxide ($Al_2O_3$). As a result, a mechanically, thermally and, if necessary, chemically highly resistant mating surface may be provided at a manageable cost. The intermediate element may be visco-elastically or also elastically deformable according to the invention. According to the invention, the sleeve element and the intermediate element or bearing part may be nondetachably connected to each other. A nondetachable connection in this case is understood in the classical sense to mean a non non-destructively releasable connection. A visco-elastically deformable intermediate element allows for a particularly simple mounting of the sleeve element on the second machine part, particularly if it is pressed together in the radial direction with the intermediate element and the second machine part.

The sealing head of the radial shaft sealing ring may have, at least in sections, a spherical, elliptical, in particular oval, or also a polygonal cross-sectional shape. The sealing head particularly preferably has a crowned shape. The sealing head in this case has an end face with a convexly shaped cross section. The sealing head may, if necessary, have multiple sealing sections, which are situated spaced apart from one another in the axial direction.

From a constructive point of view, the sealing head and the base section are connected to each other in the simplest case by an elastically deformable connecting section. The connecting section may be designed, in particular, in the form of an (elastomer) membrane. The connecting section particularly preferably has a non-linear cross-sectional profile in the radial direction. With a connecting section shaped in this way, it is possible for said connecting section to more reliably absorb or compensate for vibrations of the machine part having the sealing surface as well as irregularities of the sealing surface, as these may also first arise during operation of the sealing arrangement. This may counteract a local overloading of the sealing section that contacts the sealing surface of the sealing head and may result in a more reliable sealing capacity of the radial shaft seal. A particularly compact design of the radial shaft seal may also be implemented as a result. This is advantageous in terms of the potential range of applications of the seal arrangement. Where the connecting section forms an open space with two of its legs open to the high pressure side, the radial shaft seal ring may then be pressure-activated via the application of pressure to the seal arrangement on high-pressure side. In other words, the sealing head is pressed against the sealing surface proportionally to the operating pressure $p_w$ prevailing on the high-pressure side. As a result, the first sealing surface section of the sealing surface may be formed with a steeper profile if necessary, in order to be able to adjust as needed the fluid flow derived from the centrifugal force acting on the fluid axially in the direction of the high pressure side. This is advantageous, especially in the case of fluids other than lubricating oil, for example, gases. For this purpose, the connecting section advantageously has (at least in sections) a bow-shaped or meander-shaped, i.e. U-shaped or V-shaped, cross-sectional profile.

According to one refinement of the invention, the connecting section has multiple material-weakened areas situated one behind the other in the circumferential direction of the radial shaft sealing ring, preferably regularly spaced apart from each other. With the material weakenings of the elastically, preferably rubber-elastically deformable connecting section provided in the circumferential direction of the radial shaft sealing ring, it is possible to achieve a particularly efficient lubrication and thus cooling of the sealing zone, i.e., of the contact zone of the sealing section and of the sealing surface. As a result, this may counteract, for example, the formation of carbons in the area of the dynamic sealing zone of the seal arrangement. The material weakenings of the connecting section provide the sealing head, on the one hand, with less torque support during operation of the sealing arrangement than the non-material-weakened areas of the connecting section. These are situated in between the material weakenings in the circumferential direction of the radial shaft seal ring. During a relative movement of the two machine parts, a contact pressure curve of the sealing section on the sealing surface corresponding to the spatial distribution pattern of the material-weakened areas and the non-material-weakened areas of the connecting section is effected as a result on the sealing surface in the circumferential direction. The contact (surface) pressure of the sealing section of the sealing head that is changing or inconstant in the circumferential direction of the radial shaft seal ring enables improved lubrication of the wear-prone sealing section by the fluid on the high-pressure side of the sealing gap and seal assembly. This, without negatively influencing the sealing behavior of the radial shaft seal ring as a result.

As previously explained above, the pre-stressed sealing contact of the sealing head on the sealing surface relevant for the sealing capacity of the radial shaft seal may be caused wholly or at least partially by the connecting section. In both cases, therefore, the sealing head is pressed in the radial direction against the sealing surface by the connecting section, which is necessarily supported by the base section on the machine part that includes the seal holding structure. The base section in this case contacts the machine part that includes the seal holding structure in an axial or radial direction in a statically sealing manner. Where the connecting section includes the aforementioned material weakenings, the inconstant/changing contact pressure profile of the sealing section on the sealing surface corresponding to the spatial distribution pattern of the material weakenings is further enhanced. The sealing section of the sealing head in this case contacts the sealing surface, (essentially) with those sealing section areas that are aligned in a direction orthogonal to the sealing surface with the material weakenings of the connecting section, with a smaller contact (surface) pressure, than with those areas that are aligned with the non-weakened areas of the connecting section in a radial direction relative to the movement axis. As a result, the self-lubrication of the seal arrangement in the area of the sealing zone, i.e., a sufficient lubricating layer in the area of the contact zone between the sealing head and the sealing surface, and thus the service life of the radial shaft sealing ring, may be still further improved.

According to the invention, the connecting section in the material-weakened areas preferably has in each case a thickness which is less than 90%, in particular, less than 50% of the maximum thickness of the connecting section. The material-weakened areas are therefore not through-recesses or passages through the connecting section, but invariably seal the high-pressure side against a passage of the fluid to the low-pressure side. The connecting section may be integrally formed on the sealing head centrally or alternatively on the edge, in particular, on the edge of the sealing head on the low-pressure-side. In the former case, therefore, the sealing head extends laterally in the axial direction with respect to the movement axis in the case of a radially sealing radial shaft seal ring, and in the radial direction on both sides via the connection area of the connecting section in the case of an axially sealing radial shaft sealing ring. As a result, the sealing section of the sealing head may be pressed in a simple manner circumferentially in the radial direction against the sealing surface. In both cases, space is created on the sealing head for additional functional or add-on components of the radial shaft sealing ring.

Thus, according to one embodiment of the invention, the sealing head may have at least one holding structure in or on which a (rubber) elastically deformable pre-stressing element, in particular, a worm spring or an elastomeric ring, is held, by which the sealing head is pre-stressed against the sealing surface. Such a pre-stressing element may be provided according to the invention additionally or alternatively to a pre-stressing of the sealing head against the sealing surface mediated by the connecting section. The holding structure is preferably situated according to the invention on its rear side of the sealing head facing the base section. From a production engineering perspective as well as with respect to a simple and reliable mounting of the radial shaft sealing ring, the holding structure is advantageously designed as an annular groove. If the sealing head has only one such holding structure, then it is advantageously positioned on the high-pressure side of the sealing head. As a result, the sealing capacity of the radial shaft seal ring may be still further improved.

According to one preferred refinement of the invention, the sealing head, preferably on its rear side facing the base section, has such a holding structure on both sides of the connecting section, i.e., on the low-pressure side and on the high-pressure side. According to a first alternative embodiment, a (rubber) elastically deformable pretensioning element for the sealing head, in particular a worm spring or an elastomer ring, may be held in/on each of the two holding structures, respectively. With the pre-stressing elements of the sealing head situated spaced apart from one another, it is possible to particularly reliably press the sealing head with its sealing section in the radial direction onto the sealing surface. According to a second alternative embodiment, a support ring may be situated in/on the holding structure situated on the low-pressure side and an elastically deformable pre-stressing element, in particular a worm spring or an elastomer ring, may be held in/on the holding structure on the high-pressure side.

The support ring itself is rigid compared to the material of the radial shaft sealing ring or the sealing head, i.e., it is dimensionally stable in the radial and axial directions. The support ring may create axial or radial support for the sealing head on the low-pressure side and/or for the connecting section of the radial shaft seal ring, and thus ensure the operability of the radial shaft seal ring, even at high operating pressures of the fluid. The pre-stressing element situated on the high-pressure side may enable a sufficient contact pressure of the sealing head against the sealing surface at any time during the operational use of the seal arrangement.

According to the invention, the service life of the radial shaft seal ring may be further improved by providing the radial shaft seal ring with at least one tribo structure on the high pressure side, particularly on its front side or on its side facing the high-pressure side, i.e., with a flow element by which a fluid flow is created in the sealing gap during a relative movement of the two machine parts in such a way that the fluid flow or fluid subsequently flowing to the sealing head flows directly toward the sealing head in the area of its sealing section on the high-pressure side. Thus, a fluid flow of the fluid situated on the high-pressure side directed toward or away from the dynamic sealing zone of the seal arrangment may be generated directly or indirectly by the flow element during the operation of the seal arrangement.

According to the invention, the flow element may be designed, in particular, as a groove in the radial shaft seal ring. Such a groove may be produced simply and cost-efficiently, particularly by injection molding, with the original molding methods used in the manufacture of seals. According to an alternative embodiment of the invention, the flow element may also be designed as a through-hole in the radial shaft sealing ring or in the sealing head. The aforementioned groove is designed according to the invention to be preferably open at both ends.

For a particularly efficient flushing effect in the area of the sealing zone, the groove or the through-hole according to the invention may taper, at least in sections, in its cross-section through which the fluid may flow from the high-pressure side in the direction of the low-pressure side or of the sealing section of the sealing head. Thus, the groove may function analogously to a nozzle and accelerate the fluid again more effectively in the direction of the sealing section. As a result, the fluid may be fed via the groove to the sealing section at a high flow rate. On the whole, the desired flushing effect of the fluid may be increased even more, so that the formation of resulting carbon may be more effectively loosened from the sealing section or the sealing surface and removed from the sealing area.

According to the invention, the groove may also be designed as a blind channel open to the high-pressure side. In this special case, the fluid is deflected at the end of the groove facing the low-pressure side more or less abruptly in the direction of the sealing surface. The groove in this case may include a ramp-shaped inclined surface for the fluid on its end facing the low-pressure side, which extends diagonally toward the sealing surface.

The groove or the through-hole may be fluidly connected to an annular flow channel of the sealing head on the sealing section side, i.e., may open into this annular flow channel of the sealing head. As a result, the sealing section may be completely surrounded by the fluid in the circumferential direction on the high-pressure side. This is advantageous in terms of heat dissipation in the area of the sealing zone. An even further optimized flushing of the sealing zone is also achieved as a result. The annular flow channel is advantageously directly limited laterally (toward the low pressure side) by the sealing section of the sealing head contacting the sealing surface.

The sealing section of the sealing head may comprise a tread, which extends away from the sealing head on the end face. This tread thus protrudes beyond the contour of the end face of the sealing head. The tread may be designed rounded, i.e., with a radius, or include sealing edges on both sides. According to the invention, the sealing strip is preferably provided with a continuous, preferably macroscopically unstructured, running surface. According to one alternative embodiment, the sealing head may have multiple such treads, which are situated laterally offset relative to each other on the sealing head.

According to one preferred refinement of the invention, the flow element of the sealing head extends away from the sealing head. The flow element is thus designed analogously to a profile extension of the sealing head. From a production engineering perspective, the flow element in this case is preferably integrally formed on the sealing head. As a result, the flow element is simultaneously held captive on the sealing head. The flow element acts analogously to a blading (blade) of the sealing head. The flow element in this case may have an oval, elliptical, polygonal or triangular cross-sectional shape. A free-form cross-sectional shape analogous to a wing profile is also conceivable. The (thrust) effect of the flow element designed as a profile extension of the radial shaft sealing ring is accordingly adjustable as required by an appropriate dimensioning and shaping of the surface(s) of the flow element toward which the fluid may flow or does flow during operation. The acceleration of the fluid may be influenced by the flow element by a suitable selection of the gradient of the flow surface(s) of the flow element relative to the movement axis or relative to the local radius of the radial shaft seal ring, as well as a potential inclination of the flow surface(s) of the flow element. The flow element may also be designed to act bidirectionally, i.e., creating an axially directed fluid flow on the high pressure side of the sealing gap in both movement directions of the machine parts relative to each other.

The lubrication and cooling of the sealing section of the radial shaft sealing ring may be further improved according to the invention by providing the radial shaft seal ring with a plurality of the aforementioned flow elements. At the same time, this may even more effectively counteract thermal overstressing of the fluid and thus, for example, of the formation and deposition/storage of carbon on the sealing section of the radial shaft sealing ring. Thus, one or multiple groove-shaped and/or one or multiple flow elements, in particular, projecting from the radial shaft sealing ring may be situated while combined with one another on the sealing head. The groove-shaped flow element(s) may be situated, for example, on the end face of the sealing head facing the sealing surface and the flow element(s) projecting from the sealing head may be situated on a side of the radial shaft sealing ring or of the sealing head. As a result of the flow elements projecting away from the sealing head, in particular, it is also possible to achieve a thorough mixing of the fluid, which is advantageous from a thermal perspective.

The plurality of flow elements may be situated in a single row or even in multiple rows on the sealing head in the circumferential direction of the radial shaft sealing ring.

It should be noted that the radial shaft sealing ring may have return elements or return profiles on the low-pressure side, which are situated on the sealing head. As a result, fluid which has passed from the high-pressure side to the low-pressure side may be conveyed more reliably back again to the high-pressure side to the sealing section of the sealing head, and thereby further improving the lubrication, cooling and also return drag capacity of the radial shaft sealing ring. The return elements may be groove-shaped or also shaped as profile extensions in a manner corresponding to the aforementioned flow elements of the radial shaft sealing ring.

BRIEF DESCRIPTION OF THE DRAWINGS

The invention is explained in greater detail below with reference to exemplary embodiments shown in the drawing.

In the drawings.

DETAILED DESCRIPTION OF THE PREFERRED EMBODIMENTS

Figure 1:
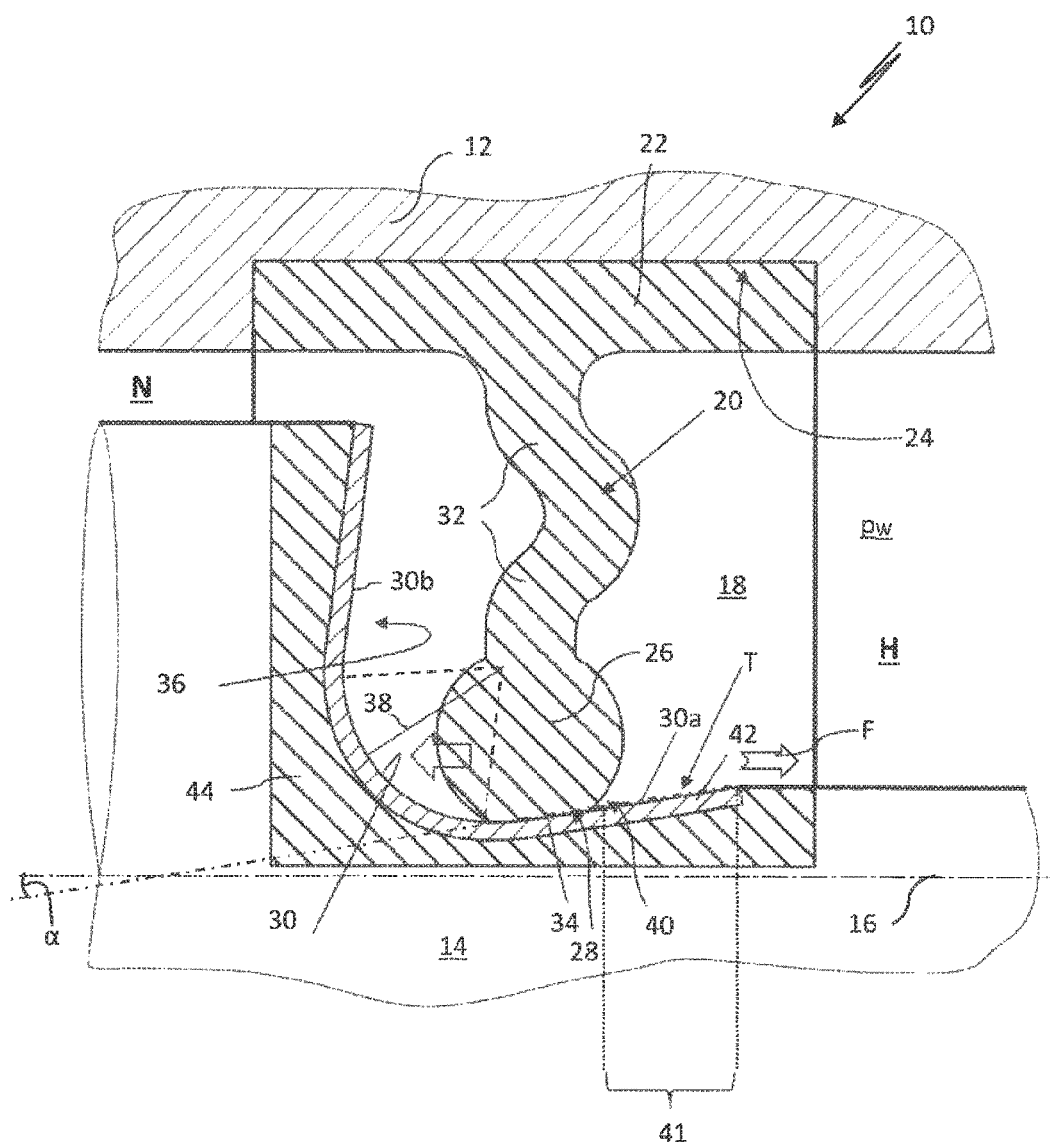
FIG. 1 shows a seal arrangement having two machine parts movable relative to one another about a movement axis, which are sealed from each other by means of a radial shaft sealing ring, which contacts a sealing surface of one of the two machine parts in the radial direction in a dynamically sealingly manner, wherein a sealing head of the radial shaft sealing ring is deflectable with respect to the sealing surface and the sealing surface has an overall trough-shaped form, in a sectional partial view.
Figure 2:
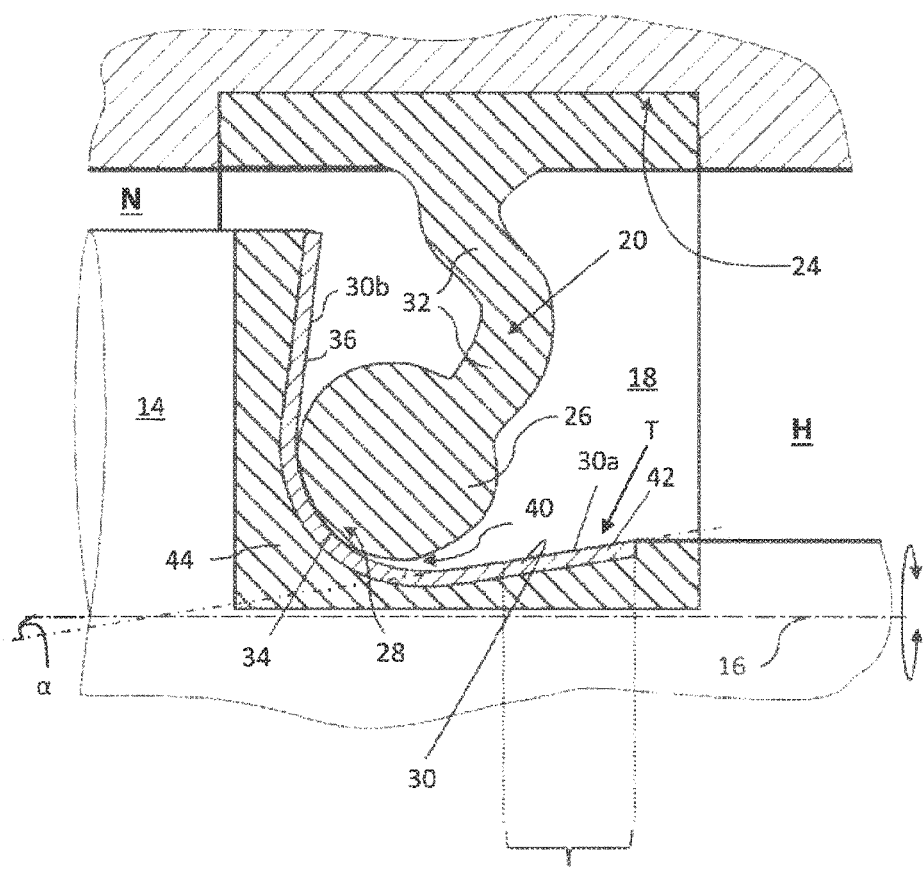
FIG. 2 shows the seal arrangement of FIG. 1 in another operating state, in which an operating pressure $p_w$ is applied to the high-pressure side, and wherein the operating pressure is greater than or equal to a limit operating pressure value $p_{limit}$, in a sectional partial view.

FIGS. 1 and 2 show a seal arrangement 10 having a first and a second machine part 12, 14, which are rotatably arranged relative to one another about a movement axis identified by 16. A sealing gap 18 is formed between the two machine parts 12, 14. The sealing gap has a high-pressure side H to be sealed, in which a fluid, in particular, a lubricant, such as, for example, oil, is disposed, which may be pressurized with an operating pressure $p_w$. The high pressure side H is sealed against a low pressure side N of the sealing gap by means of a radial shaft seal ring (RSSR) 20.

The sealing element 20 can generally be made of an elastically deformable material, preferably of an elastomer, and is preferably designed as one piece. It is understood that supporting or reinforcing parts (not shown) may be partially or completely embedded in the material of the sealing element 20.

A base section 22 of the sealing element 20 is held on a seal holding structure 24, here a holding groove, of the first machine part 12. The base section 22 may contact the first machine part 12 in the radial and/or in the axial direction in a statically sealing manner. The base section 22 in this case is held clamped in the seal holding structure 24. The base section 22 may also be fastened to, for example, pinned or adhesively bonded to, the machine part 12, 14 having the seal holding structure 24 in other ways familiar to those skilled in the art.

The sealing element 20 also has a sealing head 26. The sealing head in this case contacts a sealing section 28 on a sealing surface 30 of the second machine part 14 in the radial direction in a pre-stressed and sealing manner. The sealing head thus serves to dynamically seal the sealing gap 18. It should be noted that the radial shaft sealing ring according to FIG. 1 may be designed to be internally sealing or else externally sealing in a manner not shown in detail. The sealing head 28 and the base section 24 are connected to each other by a rubber-elastically deformable connecting section 32. The connecting section 32 in this case has a non-linear cross-sectional profile in a radial direction relative to the movement axis 16. The pre-stressed sealing contact of the sealing head 26 to the sealing surface 30 may be caused at least partially or, as in the case here, also wholly by the connecting section 32. The sealing head 26 in the exemplary embodiment shown is thus pre-stressed against the sealing surface 30 of the second machine part 14 solely by the elastic resilience inherent in the material of the connecting section 32. The connecting section 32 in this case has a membrane-like design, so that the sealing head 26 is articulated flexibly on the base section 22 in the axial direction. The sealing head 26 is also resiliently mounted relative to the first machine part 12 in a direction radial to the movement axis 16 due to the non-linear cross-sectional profile of the connecting section 32 in the radial direction. As a result, the radial shaft sealing ring 20 is able to compensate for an eccentricity of the second machine part 14, without resulting in a local overstressing of the sealing head 26 in the contact surface area of the sealing head 26 and of the sealing surface 30. The sealing head 26 of the radial shaft seal ring 20 in this case has a spherically configured cross-sectional shape with a convex end face 34. It is understood that the sealing head 26 may also have another, for example, an oval, elliptical, polygonal or free-form cross-sectional shape.

The sealing surface 30 has a particular geometric design. Thus, the sealing surface 30 comprises a first sealing surface section 30a adjacent to the high-pressure side H and a second sealing surface section 30b adjoining it in the axial direction and adjacent to the low-pressure side N. The two sealing surface sections 30a, 30b merge seamlessly into one another. The first sealing surface section 30a extends axially in the direction of the low-pressure side N away from the seal holding structure 24 and encloses an acute angle α (over its entire longitudinal extent) with the movement axis 16. The sealing surface 30 thus has a conical sleeve-like design in the area of its first sealing surface section 30a. In other words, the first sealing surface section 30a has a linear contour in the axial direction. The second sealing surface section 30b is arranged extending in the direction of the low-pressure side N, in this case curved, radially in the direction of the seal holding structure 24 of the first machine part 12. This second sealing surface section forms an axial stop 36 for the sealing head 16. A radius R of the second sealing surface section is identified by 38. The second sealing surface section 28 thus has a concave contour.

The sealing head 26 contacts the first sealing surface portion 30a of the sealing surface 30 when an operating pressure $p_w$, which is less than a specified limit operating pressure value $p_{limit}$ is applied to the high pressure side H of the sealing gap. At an operating pressure $p_w$, which is equal to or greater than the limit operating pressure $p_{limit}$, the sealing head in this case contacts the second sealing surface section 30b of sealing surface 30 also in the axial direction in a sealing manner. This ensures a reliable sealing capacity of the radial shaft seal ring 20 even at high operating pressures. The second sealing surface section 30b extends in the area of its end on the low-pressure side radially to such an extent in the direction of the first machine part 12 that the sealing head 16 of the radial shaft sealing ring 20 is completely covered by the second sealing surface section 30b in the axial direction. This may prevent an undesired extrusion of the sealing head 16 into the sealing gap 18, even at very high operating pressures $p_w$.

In the seal arrangement 10 shown in FIGS. 1 and 2, the radial shaft sealing ring 20, together with the machine part 12 having the seal holding structure 24, may rotate relative to the sealing surface 30 or the machine part 14 having the sealing surface 30 may rotate relative to the radial shaft sealing ring 20 around the movement axis 16. The fluid located on the high pressure side H is moved in the process as a result of its friction on the sealing surface 30 or on the first machine part 12, and as a result of its inherent viscosity in a flow directed around the movement axis 16 (so-called Taylor Couette flow). Where the sealing surface 30 having machine part 12, 14—relative to the movement axis 16 of the two machine parts—is the machine part 12, 14 situated radially inwardly and set in rotation, as is illustrated by the double arrow, then fluid accelerated on the surface 30 is also forced outwardly at higher rotational speeds as a result of the centrifugal force $F_{ZF}$. The fluid contacting the sealing surface 30 in this case may be pushed axially in the direction of the high-pressure side due to the adhesion forces between the fluid and the sealing surface 30 on the first sealing surface section 30a of the sealing surface 30 on the high-pressure side. In a corresponding manner, in the case of a first machine part 12 situated radially outwardly and rotating relative to the second machine part 14, the fluid will flow axially in the direction of the high-pressure side H due to its viscosity and to the interaction with adhesive forces occurring on the sealing surface 30 along the first sealing surface section 30a. Where the machine part 12, 14 having the sealing surface 30 is the machine part 12, 14 situated outwardly in the radial direction, the fluid will then flow in the direction of rotation around the movement axis 16 during a rotation of the two machine part 12, 14 relative to one another. Due to the centrifugal force $Z_{FK}$ acting on the fluid, the fluid is moved radially outwardly and flows against the first sealing surface section 30a of the sealing surface 30. The fluid will accumulate and swirl on the high-pressure side in the direction of the low-pressure side N in the area of the sealing head 16 contacting the sealing surface 30. As a result, the fluid will flow primarily axially in the direction of the high pressure side H.

An axially directed fluid flow may be generated, in particular, at high rotational speeds, due to the geometric shape of the sealing surface 30 on the high pressure side H of the sealing gap 18. As a result of this fluid flow, fluid flowing on the high-pressure side H flows toward the sealing head 16 on the high-pressure side in the area of its sealing section 28 (contact surface area) contacting the sealing surface 30, thus in the area of the dynamic sealing zone 40. As a result, the sealing zone 40 is mechanically flushed during operation of the seal arrangement 10, if necessary, freed of contaminants and the lubrication and heat dissipation from the sealing zone 40 are further improved. If sufficiently severe turbulences occur in the fluid due to the centrifugal force $F_{ZK}$ acting on the fluid, a thorough mixing of the fluid on the high-pressure side H favorable for the heat dissipation is achieved as a result. In this way, contaminants adhering to the sealing surface 30 or to the sealing head 16 may also be loosened and flushed from the sealing zone 40. The service life of the radial shaft seal ring 20 can generally be further improved by simple design measures. The first sealing surface section 30a of the sealing surface 30 may be provided in the area of its edge section 41 on the high-pressure side with spin structures or tribo structures T, by which the fluid is accelerated in the arrow direction F towards the high pressure side H during a rotationally circulating relative movement of the two machine parts 12, 14. In this way, the area of the sealing zone 40 may be flushed even more effectively, may be freed from contaminants and the lubrication and heat dissipation from the sealing zone 40 may be further improved. The sealing head 26 preferably does not contact the edge section 41 of the first sealing surface section 30a provided with tribo structures T in the non-pressure-loaded state, in order to avoid excessive friction of the sealing head 26 on the sealing surface 30 and the risk of shear damage to the sealing head 26. The tribo structures T will be discussed in greater detail in connection with the FIGS. 5 through 9.

During operation of the sealing arrangement 10, it is not possible to fully prevent a slight leakage of the fluid from the high-pressure side H to be sealed to the low-pressure side N from occurring in the area of the dynamically sealing head 16. Thus, the relative movement of the two machine parts 12, 14, the (leakage) fluid disposed on the low-pressure side N of the sealing head 16 is moved along the sealing surface 30 in the axial direction by the adhesive behavior interacting with the centrifugal force $Z_{FK}$ acting on the fluid. The fluid flows largely or completely in the axial direction toward the sealing zone 40. As a result, this also favors a lubrication of the sealing zone 40 on the low-pressure side or of the contact surface area of the sealing head 16 and the sealing surface 30, as well as an improved return drag behavior of the radial shaft seal 20 on the high pressure side H.

The sealing surface 30 of the second machine part in this case is formed by a sleeve element 42, which is fastened to the second machine part 14. As a result, the second machine part 14 may be made of a cost-efficient material or of a material unsuitable as a mating surface of the radial shaft seal ring 20. Further fine machining of the surface of the second machine part 14 may also be unnecessary. The sleeve element 42 may be pressed together with the second machine part, welded, soldered or glued or screwed to the second machine part or latched to the latter depending on the respective material of the sleeve element 42 and of the second machine part 14. The sleeve element 42 in this case is made of metal, for example, more precisely of a case-hardened steel. Alternatively, the sleeve element 42 may, for example, be made of a ceramic material. A sleeve element made of a composite material having a support structure made of metal or plastic and a sliding layer situated thereon, which forms the sealing surface 30, made of aluminum oxide, for example, is also conceivable.

The sleeve element 42 in the exemplary embodiment shown here is positioned on the second machine part 14 by an elastically deformable carrier element or intermediate element 44. The sleeve element may be pressed on the second machine part, in particular with the intermediate element 44, and thus held non-rotatably fixed on said machine part and held fixed in position in the axial direction.

Figure 3:
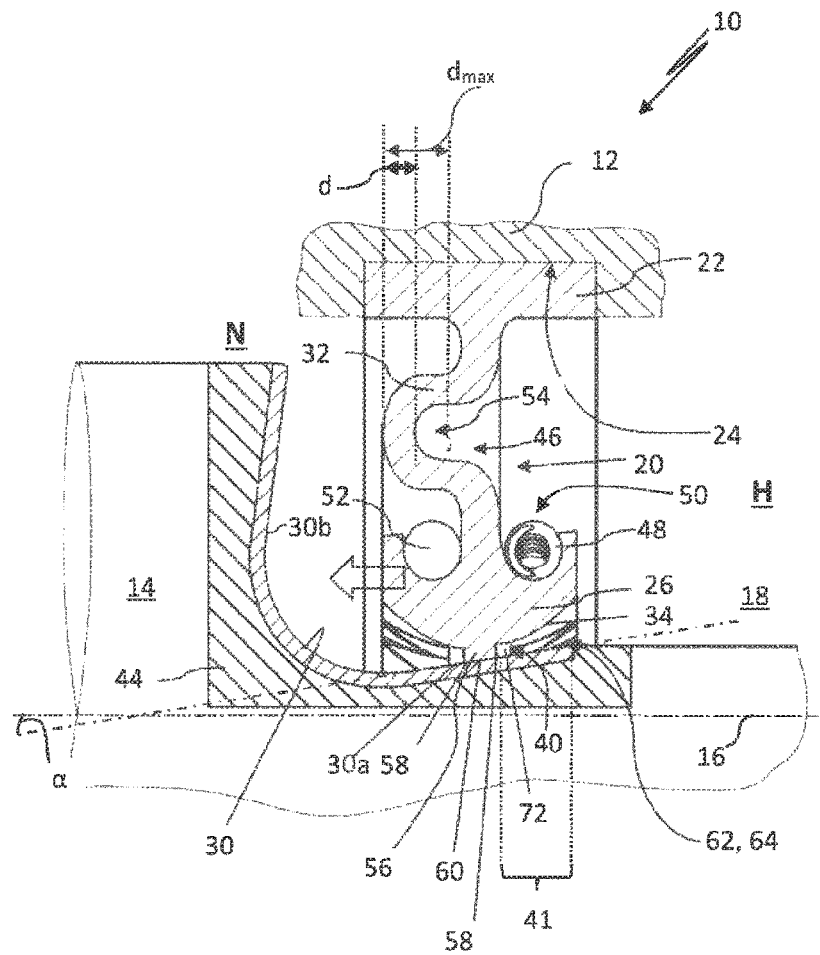
FIG. 3 shows a seal arrangement similar to FIG. 1, in which the radial shaft seal ring also comprises a plurality of flow elements on the high-pressure side, by which an axially directed flow of the fluid situated on the high-pressure side is effected during a relative movement of the machine parts.

The radial shaft sealing ring 20 according to the exemplary embodiment shown in FIG. 3 may have a bow-shaped or meander-shaped connecting section 32. An open space 46 is delimited in the radial direction on the inside and on the outside by the connecting section 32. An open space in the present case is understood to mean a volume of space, in which no component of the seal arrangement 10 is situated. This open space 46 surrounds the sealing head 16 circumferentially. The open space 46 is fluidically connected to the high-pressure side H of the seal arrangement 10. If an operating pressure $p_w$ is applied to the high-pressure side H and thus also to the free space 46, then the sealing head 16 may be pressed against the sealing surface 32 in a manner which is proportionate to the pressure Pw prevailing on the high-pressure side H in each case. The radial shaft seal ring 20 therefore generally can be activated by pressure.

The sealing head 16 may also include at least one pre-stressing element 48, which is designed separately from the radial shaft sealing ring, by means of which the sealing head 16 is stretched against the sealing surface. The sealing head 16 in this case includes a groove 50 on both sides of the connecting portion 32, in which on the high-pressure side an elastically deformable pre-stressing element 48, here a worm spring, and on the low pressure side a support ring 52, are held. In this embodiment of the radial shaft seal 10, the sealing head 16 is thus pressed at least partially by the pre-stressing element 48 against the sealing surface 30. A relief of the sealing head 16 mediated by the first ramp-like sealing surface section 30a when pressure is applied to the high-pressure side H is at least partially compensated for by the pre-stressing element 48.

The support ring 52 is made of a material having a larger elastic modulus compared to the elastomer material of the radial shaft seal ring 20. The support ring 52 is dimensionally stable and not deformable or only slightly deformable as a result of forces occurring during operation of the seal assembly 10. The sealing head 26 and also the connecting section 32 may be supported on the support ring 52 in an axial direction relative to the movement axis 16 when pressure is applied to the high-pressure side H. In addition, the connecting section 32 may be supported on the support ring 52 in the direction of the sealing surface 30, i.e., in a direction radial to the movement axis 16. Thus, the radial shaft sealing ring 16 may be mechanically stabilized in the axial direction and the sealing head 26 may be protected from an excessive contact pressure on the sealing surface 30.

The connecting section 32 may, if necessary, have multiple material-weakened areas 54, which are situated one behind the other in the circumferential direction of the sealing element, preferably spaced regularly apart one behind the other. The connecting section 32 has a thickness d in the material-weakened areas 54, which in each case is less than 90%, preferably less than 50% of the maximum thickness $d_{max}$ of the connecting section 32 in the unweakened areas thereof (represented by a dashed line in FIG. 3). It should be noted that the connecting section 32 is free of through-holes or the like. The connecting section 32 is therefore on the whole fluid impermeable. A contact pressure profile fluctuating in the circumferential direction between the sealing head 26 and the sealing surface 30 is caused by the material-weakened areas 54 of the connecting portion 32. As a result, the lubricating behavior of the sealing arrangement 10 in the area of the sealing zone 40 may be improved even further.

The sealing section may include an annular tread 56. The tread 56 extends from the end face 34 of the sealing head 26 radially away in the direction of the sealing surface 30, at least in the operating state of the radial shaft sealing ring when no pressure is applied. The tread 56 according to FIG. 3 may have a rectangular cross-sectional shape. The two sealing edges of the tread 56 are identified by 58. The tread 56 may have a continuous annular tread 60 which preferably has a macroscopically unstructured design. In the seal arrangement shown in FIG. 3 as well, the edge section 41 of the first sealing surface section 30a on the high-pressure side may advantageously be provided with tribo structures T, in order to improve the cooling, flushing and lubrication of the contact surface area of the sealing head 26 and of the sealing surface even more.

The sealing head 26 may be provided on the high pressure side with a profile system 62 for even more intensive cooling, lubrication and flushing of the dynamic sealing zone 40.

Figure 4:
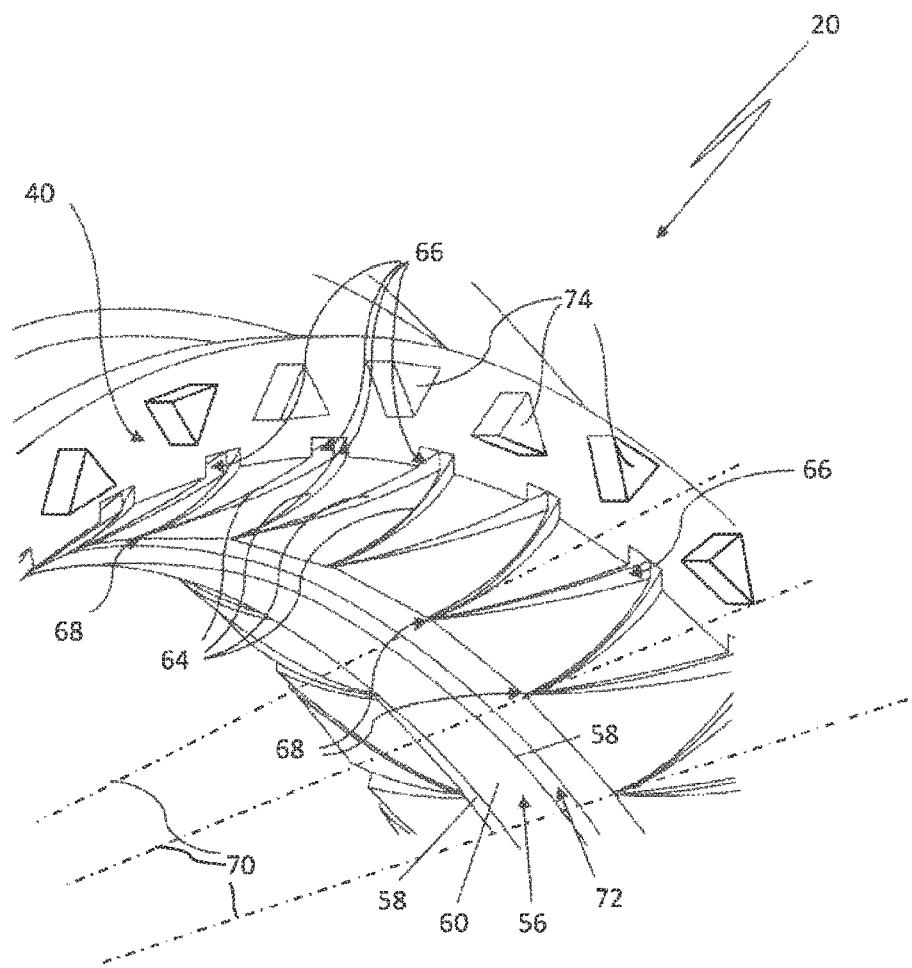
FIG. 4 shows a radial shaft sealing ring, as may be used in the seal arrangement shown in FIG. 3, wherein the radial shaft sealing ring includes groove-shaped or channel-shaped first flow elements and second flow elements designed in the form of profile extensions for generating an axial flow in the fluid disposed on the high-pressure side of the sealing gap, in a cutaway perspective detail.

The profile system 62 in this case comprises a large number of first flow elements 64, which are designed as groove-shaped recesses. The first flow elements 64 according to the cutaway view of a radial shaft seal 20 according to FIG. 4 have a first opening 66 facing the high-pressure side H and a second opening 68 facing the lower-pressure side N. The grooves extend diagonally relative to the local radius 70, at least in sections, to one side (in a direction of rotation of the machine parts 12, 14), so that during a relative movement of the two machine parts 12, 14 around the movement axis—here bidirectional—a fluid flow on the high-pressure side H of the sealing gap is created, by which fluid flows directly or indirectly toward the sealing head 26 on the high-pressure side H in the area or of its sealing zone. The grooves may also taper in the axial direction toward the sealing section 28 of the sealing head 26, in order in this way to accelerate the fluid more effectively in the grooves. At least part of the first flow elements 64 may open at one end into an annular flow channel 72 of the sealing head 26. The flow channel 72 on the end face in this case is preferably delimited immediately laterally toward the low-pressure side N by the sealing section 28 of the sealing head 26 and by its tread 58. As an alternative or in addition to the first flow elements 64, the profile system 62 of the sealing head 26 may include second flow elements 74, each of which extends in the form of profile projections away from the sealing head 26. These second flow elements 74 form a blading of the sealing head. The second flow elements 74 may, for example, have an elliptical, oval or polygonal cross-sectional shape.

The first and second flow elements 64, 74 allow for an even greater reinforced flow toward the sealing head 16 by the fluid in the area of its end face 34 or sealing section 28. The results are improved flushing, cooling and lubrication of the sealing head 26.

The sealing head 26 may also have return-flow profiles 76 on the low-pressure side, by which the return drag capacity of the seal arrangement 10 on the one hand and an additional lubrication of the sealing section 28 of the sealing head 26 contacting the sealing surface 30 from the low pressure side N on the other hand may be achieved. The return flow profiles 76 in this case may be formed in a manner corresponding to the first or second flow elements 64, 74 situated on the high-pressure side H of the radial shaft sealing ring.

Different centrifugal structures or tribo structures are shown in FIGS. 5 through 8, which the respective edge section 41 on the high-pressure side of the first sealing surface segment 30a of the seal arrangements 10 shown in FIGS. 1 through 3 may have.

Figure 5:
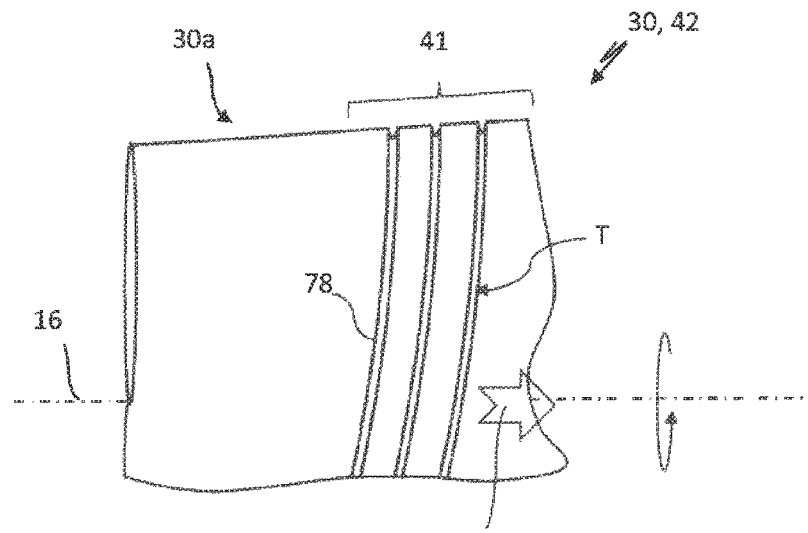
FIG. 5 shows a sealing surface of the second machine part of a seal arrangement according to FIG. 1, in which a sealing surface section on the low-pressure side has an edge section, which is provided with a groove-like tribo structure, by which an axially directed fluid flow may be generated or supported on the high-pressure side during a relative movement of the two machine parts.

According to FIG. 5, the tribostructure T may comprise a helical or helically-shaped groove 78 of the sleeve element 42 forming the sealing surface or of the machine part 12, 14 having the sealing surface or may be formed as such. The groove 78 may advantageously widen in its clear cross section in the direction of the high pressure side.

Figure 6:
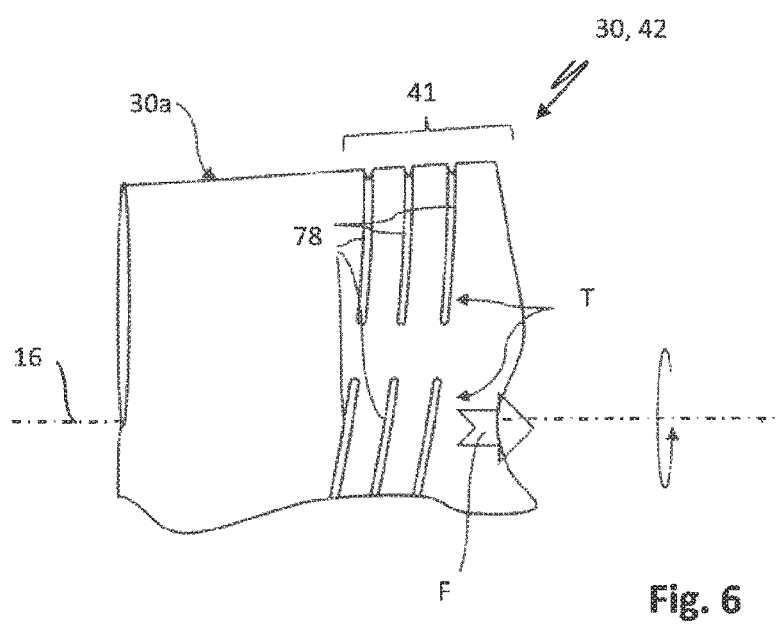
FIG. 6 shows a sealing surface similar to FIG. 5 having multiple groove-like tribo structures, in a partial side view.

The tribo structures T of the edge portion 41 of the first sealing surface segment 30a of the sealing surface 30 on the high-pressure side may also include multiple grooves 78, as is shown in FIG. 6. At least a portion of the grooves 78 is advantageously situated offset from each other in the axial direction. The grooves may also have different lengths. The grooves may also have a clear/free cross section that widens axially in the direction of the high pressure side H, in order to counteract an undesirable back pressure of the fluid in the grooves. The grooves 78, in their projection on the movement axis 16, extend preferably at an acute angle to the movement axis 16.

Figure 7:
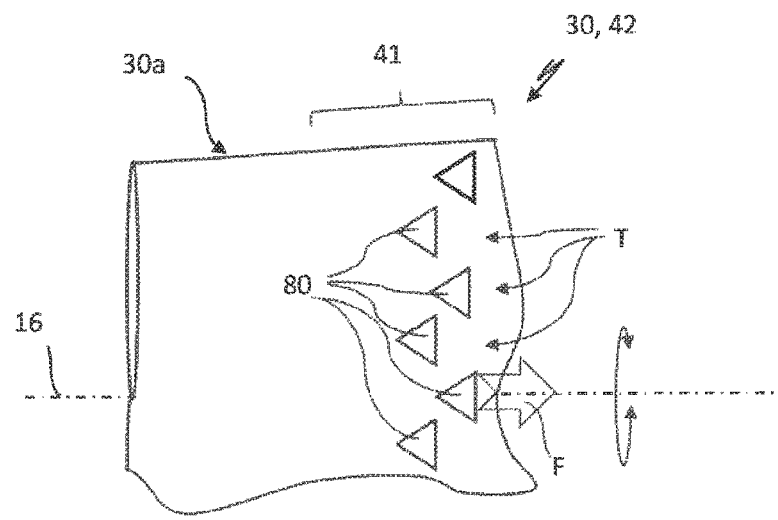
FIG. 7 shows a sealing surface similar to FIG. 5 having multiple tribo structures, which extend in the radial direction away from the sealing surface in the form of a profile extension, wherein the tribo structures here each have a triangular cross-sectional shape, in a partial side view.
Figure 8:
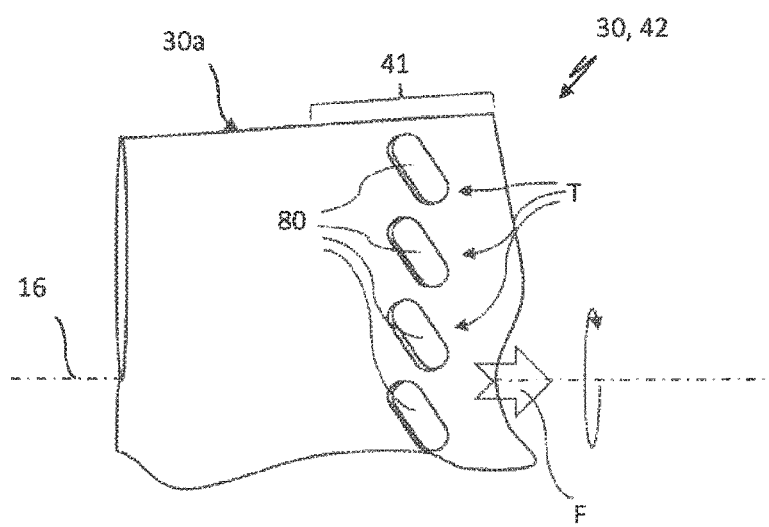
FIG. 8 shows a sealing surface similar to FIG. 5 having multiple tribo structures, which extend in the radial direction away from the sealing surface in the form of a profile extension having a modified oval cross-sectional shape, in a partial side view.

The tribo structures T of the edge section 41 of the first sealing surface section of the sealing surface 30 on the high-pressure side may also be designed in the form of elevations or profile extensions 80 of the first sealing surface section 30a according to the exemplary embodiments shown in the FIGS. 7 and 8. According to FIG. 8, the profile extensions 80 may have a triangular cross-sectional shape or, according to FIG. 9, also an (modified) elliptical cross-sectional shape. Other polygonal cross-sectional shapes or a free-form cross section are conceivable.

What is claimed is:

1. A seal arrangement comprising:
    a first machine part and a second machine part, which are arranged spaced from one another to form a sealing gap and are movable relative to each other in a rotational manner about a movement axis;
    a radial shaft sealing ring for sealing a high pressure side of the sealing gap, to which high-pressure side pressure may be applied by means of a fluid, against a low pressure side of the sealing gap;
    the radial shaft sealing ring having a base section which is held on a seal holding structure of the first machine part and including a sealing head, which is flexibly deflectable relative to the base section in the axial direction and which contacts a sealing surface of the second machine part in a pre-tensioned and sealing manner;
    wherein the sealing surface has a first sealing surface section adjacent to the high pressure side H and a second sealing surface section adjoining the first sealing surface section in the axial direction and adjacent to the low pressure side, wherein the first sealing surface section extends in the direction of the low-pressure side away from the seal holding structure and with the movement axis encloses an acute angle α;
    wherein the sealing head contacts the first sealing surface section when an operating pressure $p_w$, which is smaller than a specified limit operating pressure value $p_{limit}$, is applied to the high pressure side; and
    wherein the second sealing surface section extends radially in the direction of the low pressure side in the direction of the seal holding structure of the first machine part and forms an axial stop for the sealing head which the sealing head sealingly contacts in the axial direction when an operating pressure pw, which is equal to or greater than the limit operating pressure value $p_{limit}$, is applied to the high pressure side H.

2. The seal arrangement according to claim 1, wherein the first sealing surface section has a linearly extending contour in the axial direction.

3. The sealing arrangement according to claim 1, wherein the second sealing surface section has, a concave contour in the axial direction, which has a radius corresponding to the outer contour of the sealing head of the radial shaft sealing ring.

4. The seal arrangement according to claim 1, wherein the first sealing surface section has an edge section on the high-pressure side, which is provided with at least one tribo structure, which is designed in the form of a groove or a profile projection projecting radially away from the sealing surface.

5. The seal arrangement according to claim 1, wherein the sealing surface of the second machine part is formed, by a sleeve element, which is fastened to the second machine part.

6. The seal arrangement according to claim 5, wherein the sleeve element is pressed together with, welded, soldered or glued to the second machine part.

7. The sealing arrangement according to claim 5, wherein the sleeve element is made at least partially of metal, of a plastic or of a ceramic material.

8. The sealing arrangement according to claim 5, wherein the sleeve element is mounted on or fastened to the second machine part by an intermediate element, which is deformable in a visco-elastic or rubber-elastic manner.

9. The seal arrangement according to claim 1, wherein the sealing head of the radial shaft sealing ring has, a spherical, oval, or elliptical, cross-sectional shape.

10. The seal arrangement according to claim 1, wherein the radial shaft sealing ring is made at least partially or completely of an elastomer material.

11. The seal arrangement according to claim 1, wherein the radial shaft sealing ring is provided on the high pressure side with at least one flow element, through which a fluid flow is created during a relative movement of the two machine parts, in such a way that the fluid flows toward the sealing head in the area of the first sealing section on the high pressure side.

12. The seal arrangement according to claim 1, wherein the sealing head having flow elements that are provided by plurality of grooves or plurality of projections or combination thereof.

13. The seal arrangement according to claim 12, wherein the grooves are open at both ends.

14. The seal arrangement according to claim 12, wherein the plurality of grooves are tapered.

15. The seal arrangement according to claim 1, wherein a groove on the sealing section side is fluidically connected to an annular flow channel of the sealing head.

16. The sealing arrangement according to claim 15, wherein the flow channel is delimited laterally directly by the sealing section of the sealing head contacting the sealing surface.

17. The seal arrangement according to claim 1, wherein the sealing section of the sealing head comprises at least one annular tread, which is provided with a continuous, macroscopically unstructured, running surface.

18. The seal arrangement according to claim 11, wherein the flow element has an oval, elliptical, circular, polygonal or triangular cross-sectional shape.

19. The seal arrangement according to claim 10, wherein the radial shaft sealing ring is provided with a plurality of flow elements.

20. The seal arrangement according to claim 19, wherein the flow elements are situated one behind the other on the sealing head in the circumferential direction of the radial shaft sealing ring.

21. The seal arrangement according to claim 1, wherein the sealing head is provided with an elastically deformable pre-stressing element or with a support ring.

* * * * *